Figure 1:
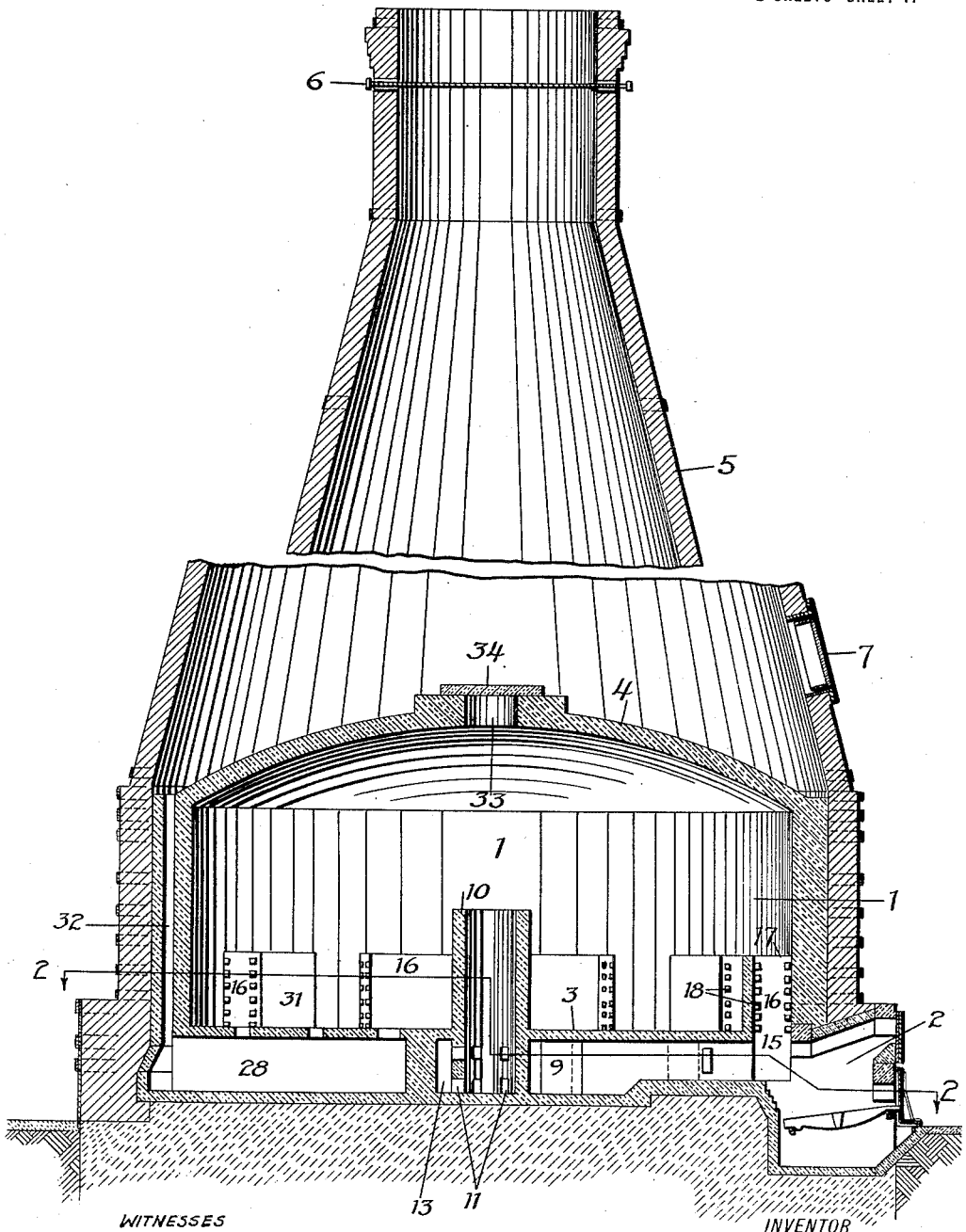

R. C. PURDY.
KILN.
APPLICATION FILED JUNE 15, 1918.

1,332,471.

Patented Mar. 2, 1920.
2 SHEETS—SHEET 2.

WITNESSES
CLAUDE EKLUND
L. F. Butterfield

INVENTOR
ROSS C. PURDY
BY
Clayton L. Jenks
ATTORNEY

UNITED STATES PATENT OFFICE.

ROSS C. PURDY, OF WORCESTER, MASSACHUSETTS, ASSIGNOR TO NORTON COMPANY, A CORPORATION OF MASSACHUSETTS.

KILN.

1,332,471.  Specification of Letters Patent.  Patented Mar. 2, 1920.

Application filed June 15, 1918. Serial No. 240,194.

*To all whom it may concern:*

Be it known that I, ROSS C. PURDY, a citizen of the United States of America, residing at Worcester, in the county of Worcester and State of Massachusetts, have invented certain new and useful Improvements in Kilns, of which the following is a full, clear, and exact specification.

My invention relates to kilns and particularly to the flue system of the "up and down draft" and "reversible draft" type kilns for burning pottery, grinding wheels, electrical insulators and other ceramic wares that are placed in saggars for burning.

Where the total output of a factory will not warrant the operation of a kiln of the tunnel type or multiple chambers as in the so-called continuous kiln, or in such manufacturing operations where the nature of the ware requires the use of so-called periodic or individual kilns, efficiency and economy of plant operation require the use of the largest kiln possible.

The only limitation to the size of the periodic kilns is even heat distribution throughout the kiln, which is necessary for the production of a uniformly standard product. In most kilns the temperature varies from the top or crown of the kiln to the floor or bottom and also varies from the outside circumference to the center, and as this variation in heat distribution in different parts of the kiln differs in kilns even though of like design, and under the several varying conditions attending the burning of a single kiln, it has been the aim of kiln designers to reduce the liability of such variation in heat treatment as much as possible.

The advantages of the larger kilns as compared with the smaller kilns, if the larger ones can be burned with as even a heat distribution, are quite obvious: (1) the capacity of a kiln is increased rapidly with increase in diameter, thus saving factory floor space and increasing the capacity of a plant: (2) the repair costs are materially reduced per ton or per value of ware: (3) the number of kiln firemen and attendants per plant capacity is decreased: (4) the whole operation of kilns, including the drawing, setting and burning of the ware is much simplified as well as made more economical, and (5) if the flue systems are properly designed and proportioned it is possible to burn large kilns in the same number of hours as is required for the smaller kilns.

The advantages of the smaller kilns are the smaller number of hours required for burning and cooling, thus affording the possibility of reducing the time of manufacturing for a given lot of ware. This advantage of the smaller kilns, the use of shorter burning and cooling time, would be considerably reduced if the flues were so designed and proportioned as to give better heat distribution.

It is accordingly an object of my invention to obviate the disadvantages previously considered inherent in the large sized kilns and to improve the construction of kilns of all sizes by providing an efficient arrangement of flues therein properly designed and proportioned to give uniform heat distribution throughout the whole kiln interior, whereby ceramic articles in all parts of the kiln may receive the same heat treatment.

With this and other objects in view, as will be apparent from the folowing disclosure, my invention resides in the combination of parts set forth in the specification and described in the claims appended hereto.

Figure 2:
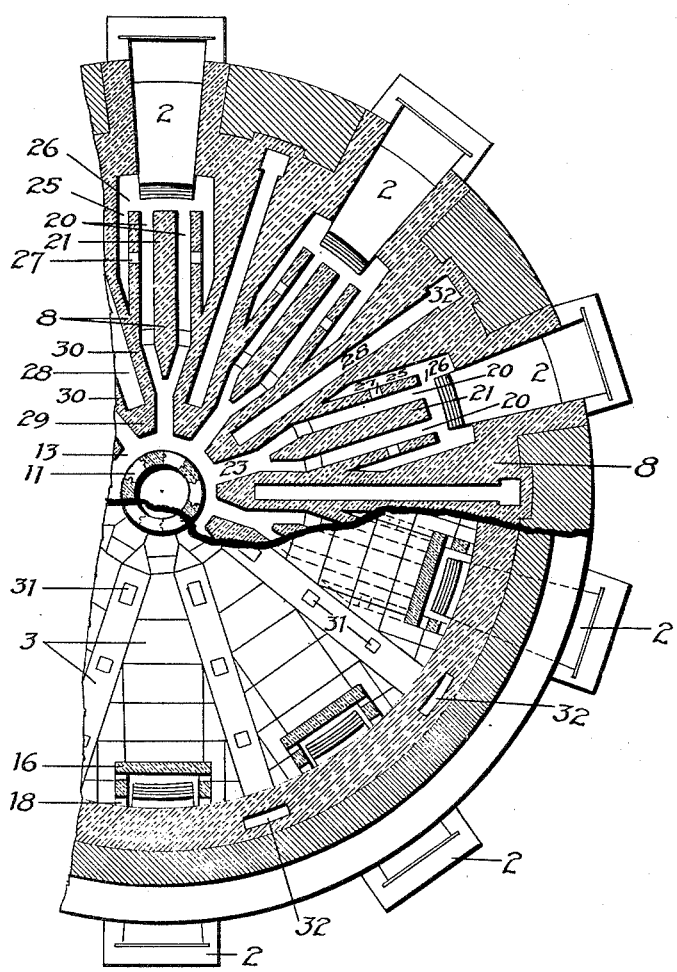

In the drawings, in which like reference numerals indicate like parts:

Figure 1 is a sectional elevation, partly broken away, of a kiln embodying my invention; and Fig. 2 is a sectional view, partly broken away, on the line 2—2 of Fig. 1, showing the arrangement of inlet and outlet flues above and below the floor of the kiln.

As a specific embodiment of my invention, I have illustrated a kiln construction built of suitable materials, such as fire brick, etc., forming a cylindrically shaped heating chamber 1 connected with coal-burning fire boxes 2 or other suitable sources of heat disposed at intervals around the exterior walls of the kiln, adjacent to the base thereof. Spaced above the floor 3 on which the articles to be burned are placed is an arched roof or crown 4 adapted to reflect the heat and keep it within the interior of the kiln. A conically shaped chimney, known generally as a cone, 5, provided with a regulating damper 6 and an entrance door 7, surmounts the kiln chamber and serves to carry away the burned gases from the several outgoing flues, thus eliminating the use of several stacks and in turn reducing the fire hazard to the factory buildings. The floor 3 is supported by a series of spaced walls 8 which form and define the various inlet and outlet conduits through which the gases pass to and from the heating chamber.

In order that the kilns may be heated evenly and efficiently, I have devised a special arrangement of flues and passages as illustrated. Each fire box 2 is connected with the heating chamber by a multiple flue 9, of such a size in cross-section and so arranged as to heat the kiln uniformly. A conduit or stack 10, supported on the kiln foundation and passing through the floor at the center of the kiln, serves to create draft necessary to some of the combustion gases from the fire boxes and to so distribute the gases as to equalize the temperature throughout the heating chamber. This stack projects considerably above the floor to prevent gas creeping along the floor to an outlet opening therein. Openings 11 are provided in the lower portion of the wall of this stack for the passage of gases from the flues 9. Since one fire box may give more heat than another or unequal draft conditions otherwise tend to prevail, I provide an annular gas-mixing room 13 around the stack 10 by stopping the radial outlet flue walls short of the stack. Each flue 9 opens into this annular passage 13 and the latter in turn opens into the stack 10 through the openings 11. By this construction the gases coming from the different flues tend to circulate around the baffle wall formed by the stack in their effort to go through the openings 11. Therefore the heated gas coming into the kiln at the center is of uniform temperature and not made up of different currents of relatively cold and warm gases.

The other inlet for the combustion gas into the kiln interior comprises an opening 15 direct from the fire box, this opening being adjacent to the peripheral wall of the heating chamber. This opening 15 leads to a passage within a vertically disposed bag wall or stack 16 which is open at the top 17 and has spaced openings 18 in its side walls, whereby the gas may issue not only through the top of this passage but through the side walls toward the ceramic material packed on the floor of the kiln.

Due to the large area of the kiln floor and the fact that the fire boxes are spaced apart by a considerable distance, there are large masses of supporting walls 8 beneath the floor, between the flues, which would be relatively cold and so affect the temperature of the floor unless this condition be obviated. I overcome this tendency by breaking up the construction beneath the flooring so as to form a plurality of heated passages through the brickwork. To this end I form the flues 9 as multiple passages converging to a single passage near the kiln center. As illustrated, the gas flue 9 may comprise two parallel passages 20 disposed on opposite sides of a floor-supporting column 21 projecting from the kiln base to the floor 3. These passages 20 open into a single large passage 23 which in turn communicates with the annular gas-mixing chamber 13. Extra flues 25, communicating with the main passages 20 through openings 26 and 27, are provided to heat the floor-supporting brickwork at the outer portions of the kiln. Each pair of flues forming a multiple flue 9 draws exclusively from a single fire box and discharges the gases into the annular gas-mixing room 13, thus obviating the disadvantages of the usual construction whereby the flues which discharges into the center well pit draw from two fire boxes.

To provide for the exhaust or escape of gases from the kiln interior, I provide outlet flues 28 radially disposed between the inlet passages. Adjacent columns defining flues 23 from pairs of fire boxes are brought together at 29 to form the outer wall portions of the gas-mixing room 13 and to provide a closed end for the outlet passage between parallel walls 30. This arrangement of outlet conduit walls permits a complete separation of the inlet conduits of adjacent fire boxes so that the gas from one fire box cannot mix with the gas from another until the annular mixing room is reached, whereby any interference with the draft of one fire box by its neighbor is obviated.

The gas exit from the heating chamber is by way of spaced openings 31 in the floor over the outlets 28, these openings preferably increasing in size toward the center of the kiln to prevent the draft short-circuiting from the passages 15 to the outlets. The innermost floor opening, by this arrangement of flue walls, is located nearer the kiln center than heretofore possible in other constructions and thereby materially increases the activity of the draft, and brings more heat to the kiln center. The outlet passages open into vertical flues 32 in the kiln wall, these in turn communicating at their upper ends with the large chimney space above the crown 4, so that gases passing out through the chimney flues may escape to the open air.

I furthermore construct these passages so that the gas is not held back by constrictions at any point, by providing that the cross-sectional areas of the inlet flues 20 are alike and uniform throughout, and that the passages 23 are sufficiently large to accommodate all the gases coming from the smaller channels 20, this being accomplished by making the flue 23 deeper than passages 20. An opening 33 is provided in the top of the crown and a cover 34 provided therefor, so that during the starting of the kiln the gases may be allowed to pass directly out through the chimney, and thereby afford a more direct draft. This cover is, however, placed over the opening during the actual burning of the ceramic ware so that the gas is forced to travel circuitously as previously described.

The operation of the kiln is obvious from the above disclosure. The gases coming from the fire boxes 2 pass both through the opening 15 into the peripheral portion of the kiln and along the passages comprising the inlet flues 9 to the gas-mixing passage 13 and the centrally located stack, and then into the interior of the kiln. After circulating through the heating chamber 1 these gases pass downwardly through the openings 31 into the radially disposed outlet conduit 28 and then into the vertical flues 32 and up the chimney.

By this arrangement of flues, I insure an even heating of the kiln and an economical use of the heating fuel, because the passages are so proportioned and shaped that the gases must mix before entering the heating chamber and must divide in correct proportions between the inlet stacks 10 and 16. I furthermore provide a construction which not only makes possible the use of larger kilns than heretofore thought possible but increases the efficiency of small sized kilns.

Having thus described my invention, what I claim as new and desire to secure by Letters Patent is:

1. A ceramic kiln comprising walls defining the sides, top and floor of a heating chamber and a plurality of inlet flues beneath the floor, fire boxes adjacent the exterior of the chamber opening into said flues, a baffle wall opposite the exits of adjacent flues forming a room wherein the gases coming from several fire boxes are mixed, a conduit pipe from said room to the exterior of the heating chamber above the floor and means for exhausting the gases from the heating chamber.

2. A ceramic kiln comprising walls forming a heating chamber for articles to be burned, a flooring therefor, fire boxes adjacent the exterior thereof, a centrally located vertical conduit extending and opening beneath and above the floor of the heating chamber for the passage of gas, walls forming inlet flues beneath the flooring connecting said fire boxes with an annular gas-mixing room around and communicating with the conduit and means providing a gas outlet from the heating chamber.

3. In a ceramic kiln, walls forming a heating chamber, a floor therefor, fire boxes peripherally disposed about the chamber, a centrally disposed stack opening above and beneath the floor, walls separating the fire boxes and extending inwardly to positions spaced circumferentially about the stack, thereby forming multiple radial inlet flues from each fire box, and a gas-mixing room about and communicating with the stack beneath the floor, bag walls providing a separate opening from each flue to the heating chamber adjacent the peripheral wall thereof and means providing a gas outlet through the floor to a chimney opening to the atmosphere.

4. In a ceramic kiln, walls forming a heating chamber, a floor therefor, fire boxes disposed about the periphery of the chamber, a centrally located stack projecting through the floor and having an opening into the heating chamber, and one beneath the floor, walls supporting the floor and forming inlet flues comprising a plurality of substantially radially disposed passages connecting each fire box with a single large passage of a gas-carrying capacity equal to that of the several passages, said walls stopping short of the stack to form an annular gas-mixing room thereabout for receiving gases from the large passage of each inlet flue and distributing them to the stack opening, walls forming radially disposed outlet flues beneath the floor which has openings therethrough to said flues and means for carrying gases therefrom to the atmosphere.

5. In a kiln comprising walls inclosing a heating chamber for the objects to be burned and fire boxes arranged circumferentially about the kiln, the combination with a floor for the heating chamber having inlet and outlet openings therein, of flue walls beneath the floor forming radially disposed, unconstricted flues from said fire boxes to said inlet openings alternating with outlet conduits from the chamber, said walls terminating at a distance from said center so as to form a gas-mixing room, a centrally located, open-topped stack projecting from the kiln base through the floor and having spaced openings communicating with said mixing room, a perforated bag wall above the floor and defining a conduit opening from the inlet flue of each fire box to the heating chamber adjacent the peripheral wall of the kiln, and a chimney surmounting the kiln-heating chamber, the kiln walls having vertical flues therein connecting the radially disposed outlet conduits with the chimney to provide a draft for the fire boxes.

6. A ceramic kiln comprising walls defining a heating chamber, fire boxes around the periphery of the chamber, walls forming sets of radially disposed, multiple inlet flues, each set comprising a plurality of passages drawing from a single fire box, a baffle wall opposite the exits of said flues defining a gas-mixing room, walls forming a separate communicating passage from each set of inlet flues to said room, a conduit from said room to the heating chamber and means for exhausting gases from the latter.

7. A ceramic kiln comprising walls defining the sides, top and floor of a heating chamber, fire boxes around the periphery of the chamber, walls beneath the floor defining sets of radially disposed, multiple inlet flues having unrestricted passages of equal draft, each set drawing solely from one fire box, outlet passage walls radially disposed between the inlet flues and terminating near the center of the kiln to form a peripheral wall, a baffle wall concentric within said peripheral wall and forming therewith a gas-mixing room, said inlet flues discharging into said room through the peripheral wall and said floor being provided with openings into the inner ends of the outlet flues, a gas conduit and means to exhaust the gases from the outlet flues.

Signed at Worcester, Massachusetts, this 13th day of June, 1918.

ROSS C. PURDY.